United States Patent
Myers et al.

(10) Patent No.: US 8,491,054 B2
(45) Date of Patent: Jul. 23, 2013

(54) VEHICLE SEAT

(75) Inventors: Timothy S. Myers, Northville, MI (US);
Keith R. Ziegler, Westland, MI (US);
Michael J. Leighton, LaSalle (CA)

(73) Assignee: Johnson Controls Technology Company, Holland, MI (US)

( * ) Notice: Subject to any disclaimer, the term of this patent is extended or adjusted under 35 U.S.C. 154(b) by 545 days.

(21) Appl. No.: 12/524,223

(22) PCT Filed: Jan. 24, 2008

(86) PCT No.: PCT/US2008/000879
§ 371 (c)(1),
(2), (4) Date: Apr. 14, 2010

(87) PCT Pub. No.: WO2008/091638
PCT Pub. Date: Jul. 31, 2008

(65) Prior Publication Data
US 2010/0231021 A1 Sep. 16, 2010

Related U.S. Application Data

(60) Provisional application No. 60/897,131, filed on Jan. 24, 2007.

(51) Int. Cl.
*B60N 2/02* (2006.01)
(52) U.S. Cl.
USPC .................................... 297/378.12; 297/378.1
(58) Field of Classification Search
USPC .............................. 297/378.1, 378.12, 463.1
See application file for complete search history.

(56) References Cited

U.S. PATENT DOCUMENTS

| 5,788,330 | A | | 8/1998 | Ryan | |
|---|---|---|---|---|---|
| 6,007,153 | A | * | 12/1999 | Benoit et al. | 297/378.12 |
| 6,619,744 | B2 | * | 9/2003 | Reubeuze | 297/378.12 |
| 6,848,745 | B1 | * | 2/2005 | Tsuge | 297/367 R |

(Continued)

FOREIGN PATENT DOCUMENTS

| DE | 19960878 A1 | 7/2001 |
|---|---|---|
| JP | 2001-169846 | 6/2001 |
| JP | 2006-122570 | 5/2006 |

OTHER PUBLICATIONS

International Preliminary Report on Patentability corresponding to PCT/US2008/000879, dated Aug. 6, 2009, 7 pages.

(Continued)

*Primary Examiner* — David Dunn
*Assistant Examiner* — Philip Gabler
(74) *Attorney, Agent, or Firm* — Foley & Lardner LLP

(57) ABSTRACT

A vehicle seat system including a seat-bottom (1.7) and a.seatback (15) wherein the seatback (15) is prevented from rotating by both a recliner mechanism (50) and a latch mechanism (60) connected to the seatback (15). The latch mechanism (60) is configured to be disengaged to permit rotation of the seatback (15), to a forward position to aid ingress into a rearward positioned seat, which in turn releases a pair of tracks to shuttle the seat forward, to provide for easier ingress into a rearward positioned seat. When the latch mechanism (60) is released or unlocked, the recliner mechanism (50) release handle is free to rotate, but the lockout mechanism is prevented from, releasing the recliner mechanism. The seat is configured so that the seatback (15) unfolds and returns to the specific comfort position prior to activation of the latch mechanism release handle (23).

20 Claims, 4 Drawing Sheets

U.S. PATENT DOCUMENTS

| | | | |
|---|---|---|---|
| 7,328,954 B2 * | 2/2008 | Sasaki et al. | 297/378.12 |
| 2006/0181133 A1 * | 8/2006 | Sugama et al. | 297/378.1 |
| 2007/0236067 A1 * | 10/2007 | Nathan et al. | 297/378.12 |
| 2009/0001797 A1 * | 1/2009 | Neumann | 297/378.12 |

OTHER PUBLICATIONS

Chinese 1st Office Action as received in corresponding China Application No. 200880008646.7 and its English Translation, 6 pages.

International Search Report and Written Opinion corresponding to PCT Application No. PCT/US2008/000879 dated Jun. 24, 2008, 8 pages.

European Official Communication dated Feb. 28, 2012 as received in corresponding European Application No. 08724732.6, 3 pages.

Japanese Office Action received in connection with Japanese Application No. JP 2009-547282; dtd Nov. 6, 2012.

English Translation of Chinese Office Action as received in connection with Chinese Application No. 2008800086467; dtd Jan. 28, 2013.

Chinese Office Action as received in connection with Chinese Application No. 2008800086467; dtd Jan. 28, 2013.

* cited by examiner

VEHICLE SEAT

CROSS REFERENCE TO RELATED APPLICATIONS

The present application is a National Stage of PCT/US2008/000879, filed Jan. 24, 2008 which claims the benefit of and priority to U.S. Provisional Patent Application No. 60/897,131 filed Jan. 24, 2007. The foregoing applications are incorporated by reference herein in their entirety.

BACKGROUND

The present application relates generally to the field of automotive vehicle seat systems and more specifically to the field of mechanisms for use in automotive vehicle seat systems having the purpose of providing increased utility to the user.

Traditionally, seat assemblies in vehicles have been known to provide adjustability for users for the purpose of utility or convenience, including, for example, the ability to move a seat positioned for occupant seating to a position such that a passenger may more easily gain entry to a seat positioned behind the adjustable seat. It has been known to provide adjustability of a "front row" seat to a forward position to gain ingress to a "second row" seat on vehicles such as a coupe (i.e. a two door vehicle) as well as providing adjustability of "second row" seats to a forward position to gain ingress to a "third row" seat on vehicles such as vans, trucks, sport utility vehicles, and others similarly configured with more than two rows of seats.

Many different ways have been utilized to adjust the seat to a forward ingress position. For example, the seatback may be rotated with respect to the seat cushion while, at the same time, releasing a pair of tracks (typically used for comfort adjustment of the seat in the forward and rearward directions) to allow the seat to shuttle forward (i.e. towards the instrument panel of a coupe vehicle), thereby maximizing the ingress/egress space for the user. Also, to achieve a forward ingress position, the seatback may rotate from a reclined comfort position for occupant seating into a folded position, in which the seatback is folded down toward the seat base.

One problem associated with many adjustable seat assemblies is that when the seat is folded, the original desired position of the seatback (i.e., a user's comfort position) may be lost, requiring it to be re-set upon unfolding the seatback portion. Accordingly, it would be advantageous to provide a seat assembly having a "memory" feature such that the seatback may return to the desired comfort position (i.e. the specific position prior to folding the seatback) after the seatback is unfolded from its easier ingress position.

It would also be advantageous to provide this memory feature such that the comfort adjust handle would still be allowed to rotate, while the seat was in its forward ingress position. This would convey to the user that the handle and, thus, the connected mechanism is still operable, without allowing for loss of user's specific comfort position.

Accordingly, it would be advantageous to provide a seat assembly having a mechanism system that provides one or more of these advantageous features or addresses one or more of the above-identified concerns. Other features and advantages will be made apparent from the present disclosure.

SUMMARY

A vehicle seat system including a seat bottom and a seat back is provided. The seat system includes a recliner mechanism for providing rotation of the seat-back. The recliner mechanism included a tooth plate pivotally connected to a base plate through an internal gear mesh. The seat system includes a lockout mechanism to prevent unlocking of the recliner mechanism when seat system is in the forward ingress position. The lockout mechanism includes a rotatable lockout lever which contains a slot configured to retain a lockout pin. The seat system includes a latch mechanism for providing rotation of the seatback to provide easier ingress to another rearward positioned seat and to induce actuation of the lockout mechanism. The latch mechanism includes a side plate pivotally connected to the recliner mechanism tooth plate through a gear mesh.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
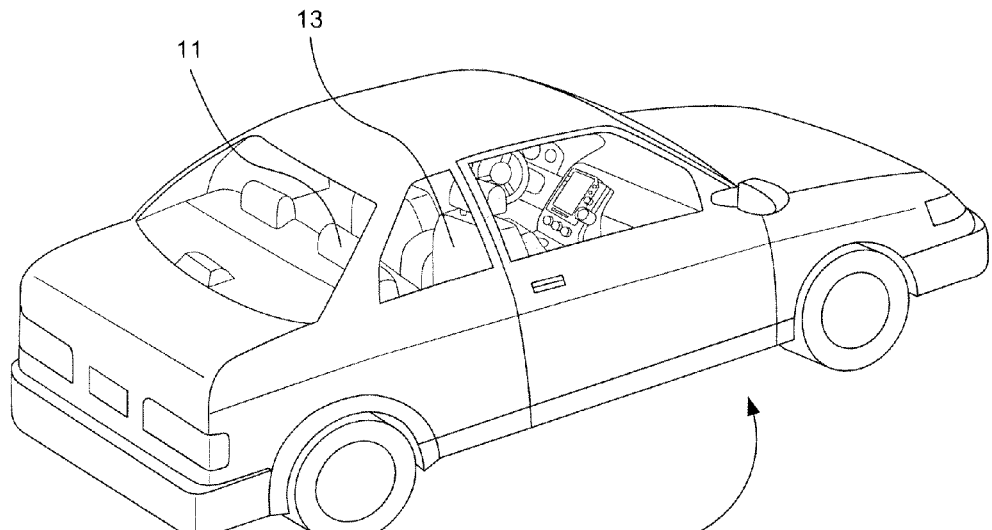
FIG. 1 is a perspective view of an automotive vehicle.

An exemplary embodiment of a vehicle seat that provides the convenient utility of a rotatable seatback, to provide adjustable comfort to the occupant. The seat allows for repositioning of the seatback to aid ingress into a seat positioned rearward of the adjustable seatback. The seat includes a recliner mechanism and a comfort adjust handle for adjusting the position of the seatback. The seat includes a memory feature to lock the recliner mechanism in its current comfort position, yet still permits the comfort adjust handle to rotate. These functions are achieved by a seat mechanism which couples the recliner mechanism to a latch mechanism through a lockout mechanism.

Numerous types and designs of recliner mechanisms are known. For example, a recliner mechanism is shown and described in U.S. Provisional Patent Application No. 60/878, 765 filed Jan. 5, 2007, the entire disclosure of which is incorporated herein by reference. The recliner mechanism allows the seatback to rotate with respect to the seat cushion to provide adjustability so the user can locate a desired comfort position. According to an exemplary embodiment, the recliner mechanism is a rotary, discontinuous locking type, that includes a tooth plate, which is coupled to the seatback and through an internal meshing of gears, is pivotally coupled to a base plate, which is also coupled to the seat cushion. According to an exemplary embodiment the recliner mechanism may be unlocked directly, through rotation of a release handle. The release handle is rigidly connected to an actuator, which is pivotally connected to a drive. Rotation of the release handle rotates the actuator, which contains a finger that may rotate into contract with a lockout pin, and subsequently rotates the lockout pin with continued release handle rotation. Through continued rotation of the release handle the lockout pin may contact the finger of the drive and then rotate the drive. The recliner mechanism disengages allowing for rotation of the seatback after a preset rotation of the drive, which is rigidly connected to the cam, internal to the recliner mechanism.

An alternative embodiment may use a remote release lever, which is connected to a cable which is then connected to the actuator. The recliner mechanism may be single sided (i.e. one recliner mechanism per seat) or dual sided (i.e. two recliner mechanisms per seat), in which a synchronization tube or additional cable is utilized for actuating the "slave" recliner when the "lead" recliner is actuated. Those skilled in the art will recognize that although the seat mechanism is discussed and illustrated using a rotary, discontinuous locking type, that other recliners (e.g. continuous locking, pawl and sector, etc.) may be utilized for use within the seat mechanism to provide equivalent functionality.

The latch mechanism allows for rotation of the seatback with respect to the seat cushion for the purpose of repositioning the seat to aid ingress into a rearward positioned seat, and may comprise of a conventional cam, pawl, and sector type or another latch type mechanism. Repositioning of the seat may be induced by pulling a release lever that may be directly attached or remotely attached to the cam, thereby driving the cam out of engagement with the pawl. The cam may then drive the teeth of the pawl out of mesh with the teeth of the sector, thereby allowing for rotation of the seatback. According to an exemplary embodiment, the teeth that serve as the sector of the latch mechanism are incorporated or integrated onto the tooth plate of the recliner mechanism. To allow the seatback to rotate, a bushing pivotally connects the recliner mechanism tooth plate and the latch mechanism side plate, which is rigidly connected to the back frame contained within the seatback.

The seat includes a lockout mechanism that serves to provide the seat with a memory function that prevents release, or unlocking, of the recliner mechanism when the latch mechanism is unlocked. The lockout mechanism includes a lockout cable that may have one end pivotally connected to a release stud, which is rigidly fixed to the latch mechanism's cam. Rotation of the cam pulls the cable along the arc of a release stud. The lockout cable's other end may be connected to a lockout lever, which rotates when the cable is stroked or pulled. Rotation of the lockout lever rotates a lockout pin to a position in which the actuator, which is rigidly connected to the comfort adjust release handle, may not contact the lockout pin when rotated. The actuator is not able to contact the lockout pin when rotated. As a result, the actuator may not induce rotation through the lockout pin onto the drive, which would release the recliner mechanism. However, the actuator and the drive are pivotally connected and, as a result, the actuator and release handle, which are rigidly connected, may rotate freely about the drive. A spring may be used to provide torque, to return the actuator and release handle to the home position and to reduce or eliminate any noise issues.

Referring to FIG. 1, an exemplary embodiment of an automotive vehicle 10, including a rear seat system 11 and a (front) seat system 13, is illustrated. Seat system 13 provides the convenient utility of a rotatable seatback, to allow the occupant adjustability for comfort, and to allow the seat to be repositioned to aid ingress into a rearward positioned seat, which includes a memory feature to lock the recliner in its current comfort position, yet allowing the comfort adjust handle to rotate.

Figure 2:
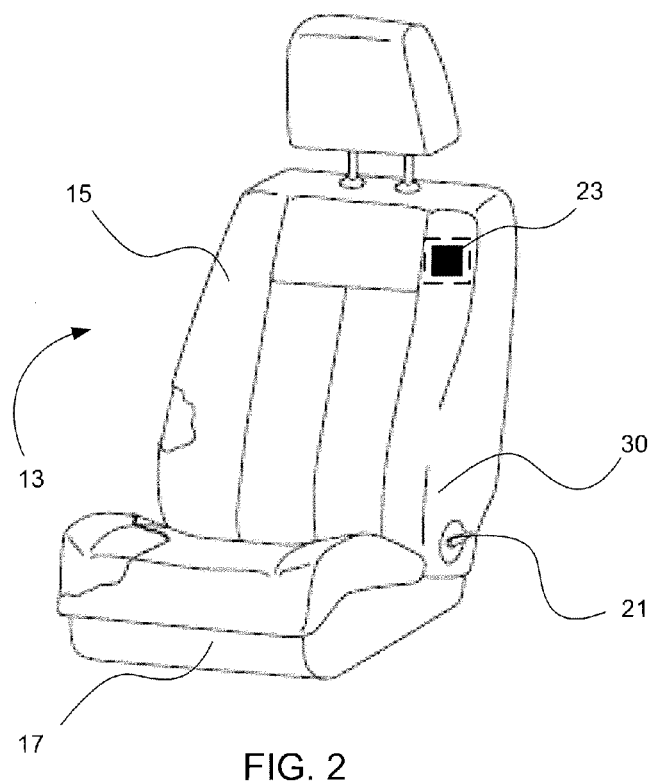
FIG. 2 is a perspective view of an exemplary seat system used in an automotive vehicle.

Referring to FIG. 2, an exemplary embodiment of seat system 13, including a seatback 15, a seat cushion 17, a recliner (comfort adjust) release handle 21, a latch mechanism release handle 23 and a seat mechanism 30 (contained within seat system 13), is illustrated. Recliner release handle 21, when actuated, communicates to seat mechanism 30 to allow for seatback 15 to rotate with respect to seat cushion 17 so that the user may find a desired comfort position. Latch mechanism release handle 23, when actuated, communicates to seat mechanism 30 to allow for seatback 15 to rotate with respect to seat cushion 17, which may then in turn release tracks (allowing seat system 13 to slide forward) so that user may gain more room for ingress to rear seat system 11. During this increased ingress seat position, recliner release handle 21 may rotate, but does not release or unlock recliner mechanism, thereby providing memory of the seatback's specific comfort position when seatback 15 is rotated back to comfort position. Recliner release handle 21 and latch mechanism release handle 23 may be located anywhere on seat system 13.

Figure 3:
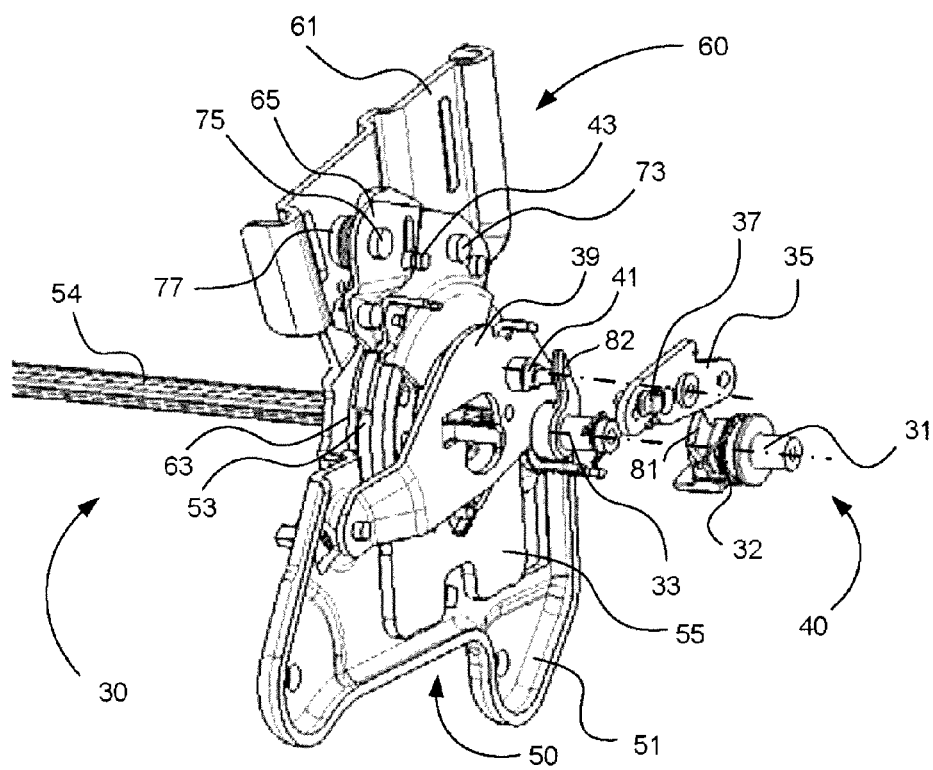
FIG. 3 is a perspective view, partially exploded for clarity, of an embodiment of a seat mechanism in an occupant seated position.

FIG. 3 is a partially exploded view of an exemplary embodiment of seat mechanism 30 that includes a lockout mechanism 40, a recliner mechanism 50, a cushion-frame mounting bracket 51 and a latch mechanism 60. Lockout mechanism 40 includes an actuator 31, a spring 32, a drive 33, a lockout lever 35, a lockout pin 37, a retainer bracket 39, a pivot stud 41 and a lockout cable 45 (shown in FIG. 5). Latch mechanism 60 includes a cable attachment stud 43, a back-frame mounting bracket 61, a pivot bushing 63, and a side plate 65, a cam 67 (shown in FIG. 4), a pawl 69 (shown in FIG. 4), a stop stud 71 (shown in FIG. 4) a pawl pivot 73, a cam pivot 75 and a cam return spring 77. Recliner mechanism 50 includes a base plate 55, rigidly connected to cushion-frame mounting bracket 51, and a tooth plate 53, rigidly connected to one end of pivot bushing 63. Tooth plate 53 and base plate 55 are pivotally coupled through an internal gear mesh. Cushion frame mounting bracket 51 may be rigidly connected to the cushion frame. Pivot bushing 63 may have the other end rigidly connected to back-frame mounting bracket 61. Recliner release handle 21 may be rigidly connected to actuator 31, which is pivotally connected to a drive 33. The release handle 21 and the actuator 31 share the same axis of rotation.

Drive 33 may be keyed to a synchronization tube 54, which is connected to the cam contained within recliner mechanism 50 for the purpose of releasing recliner mechanism 50 when rotated. In the exemplary embodiment disclosed in FIGS. 3 and 4, synchronization tube 54 is connected to both recliners used in a dual sided application for the purpose of releasing both simultaneously. An alternative embodiment may have one recliner with its cam connected to a release shaft, which may be keyed to drive 33. Lockout lever 35 is pivotally connected, about its center, to pivot stud 41 and contains on one end a cable attachment feature and on its other end a slot which contains while allowing for translation of lockout pin 37 along the slot. Pivot stud 41 is rigidly connected to retainer bracket 39, which is rigidly connected to cushion frame mounting bracket 51.

Figure 4:
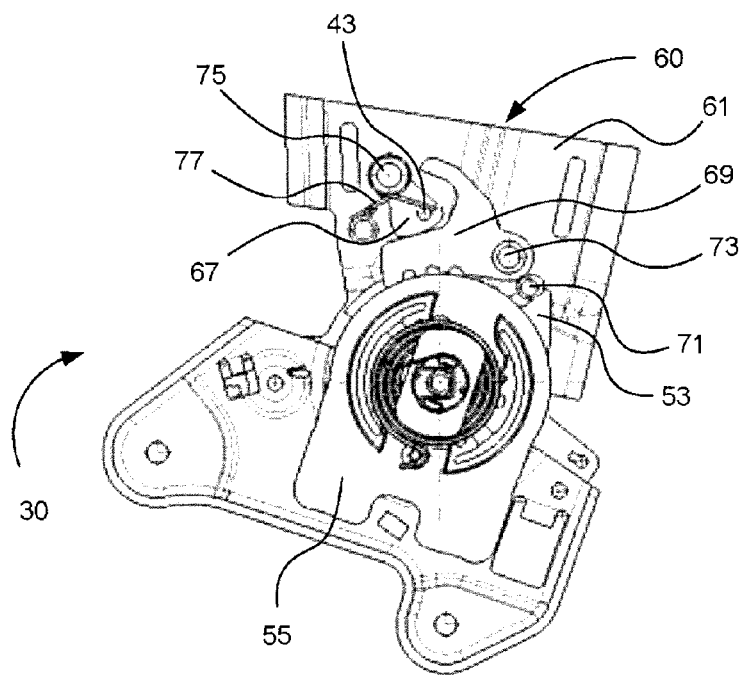
FIG. 4 is a side view of a seat mechanism (latch side plate removed) showing internals of an exemplary latch mechanism.

Referring to FIG. 4, a side view of an exemplary latch mechanism 60, which allows the seatback to rotate when unlocked, is illustrated. The latch mechanism 60 includes a cam 67, which is pivotally connected to a cam pivot 75, and a pawl 69, which is pivotally connected to pawl pivot 73. The cam 67 and pawl 69 are contained between side plate 65 (removed from FIG. 4 for clarity) and a back-frame mounting bracket 61. Pawl 69 has teeth which mesh with external teeth of tooth plate 53. Latch mechanism 60 may include a stop stud 71 for the purpose of controlling rearward travel and for removing clearance in conjunction with cam 67 being induced to rotate by cam return spring 77. Actuation is achieved (in this exemplary embodiment) by pulling on latch mechanism release handle 23, which strokes a cable, which is connected to cable attachment stud 43, that in turn rotates cam 67 in a counter-clockwise direction, about cam pivot 75. The counter-clockwise rotation of cam 67 causes the corresponding rotation of pawl 69 in a clockwise direction. The rotation of the pawl 69 disengages teeth of pawl 69 from teeth of tooth plate 53. Seatback 15, which is connected to back-frame mounting bracket 61 may then rotate with respect to seat cushion 17. In an alternative embodiment not shown, the track system would be released by the rotation of seatback 15, allowing for seat system 13 to shuttle forward, to allow for user to maximize ingress into rear seat system 11.

Figure 5:
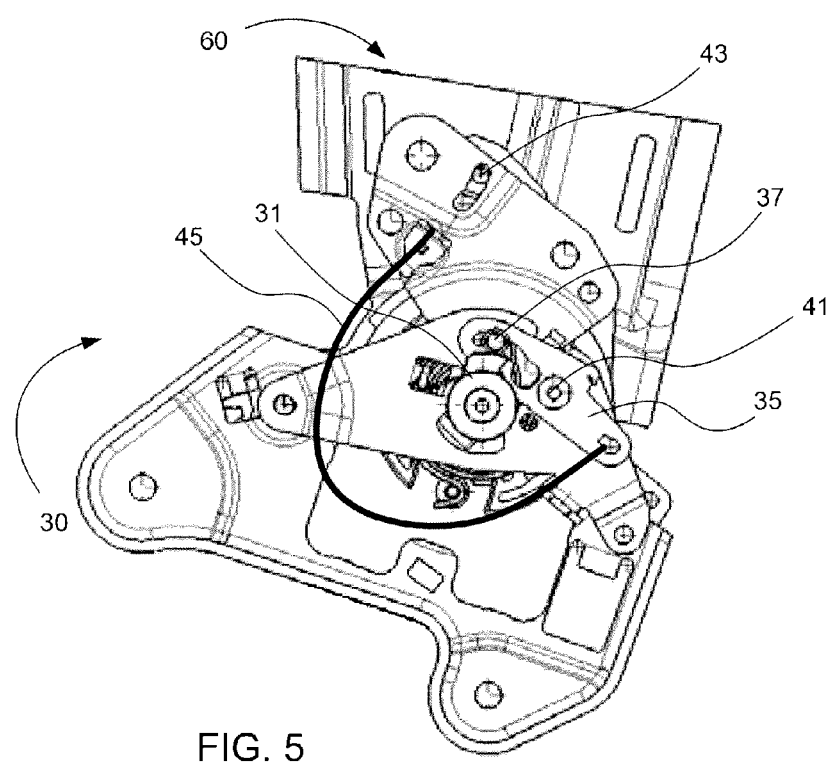
FIG. 5 is a side view of a seat mechanism in an occupant seated position, with latch mechanism unlocked, thus preventing recliner from unlocking, but showing recliner handle still rotatable.

FIG. 5 discloses, an exemplary embodiment of seat mechanism 30 in an occupant seating position. Latch mechanism 60 is unlocked, inducing lockout of recliner mechanism 50, which provides memory when the seatback is unfolded. As a result of latch mechanism 60 being unlocked, lockout mechanism 40 prevents recliner mechanism 50 from being able to be released or unlocked.

During operation of the seat, actuation of latch mechanism release handle 23, causes corresponding movement of a cable that is connected to cable attachment stud 43 thereby moving stud 43. Lockout cable 45 has one end connected to cable attachment stud 43 and the other end connected to lockout lever 35. Movement of cable attachment stud 43 induces lockout cable 45 to stroke, which rotates lockout lever 35 in a clockwise direction, about pivot stud 41, which further induces lockout pin 37 to rotate, about pivot stud 41. Lockout pin 37 may rotate free of the arc through which the finger 81 of actuator 31 rotates, so that rotation of actuator 31 may cause the finger 81 to rotate under and clear of lockout pin 37. Recliner release handle 21 may then be rotated without release of recliner mechanism 50. Seatback 15 may then be rotated to its forward position for increased ingress and then unfolded back to the specific comfort position of seatback 15 prior to latch mechanism release handle 23 actuation.

An alternative embodiment may include a spring or similar device to return actuator 31 to its home or locked position by inducing a counter-clockwise rotation of both actuator 31 and recliner release handle 21, which may also allow for easier return of lockout pin 37 to its home position. Another alternative embodiment may include a spring or other suitable device to return lockout lever 35 to its home position, whereby the lockout pin 37 finds it home position.

Figure 6:
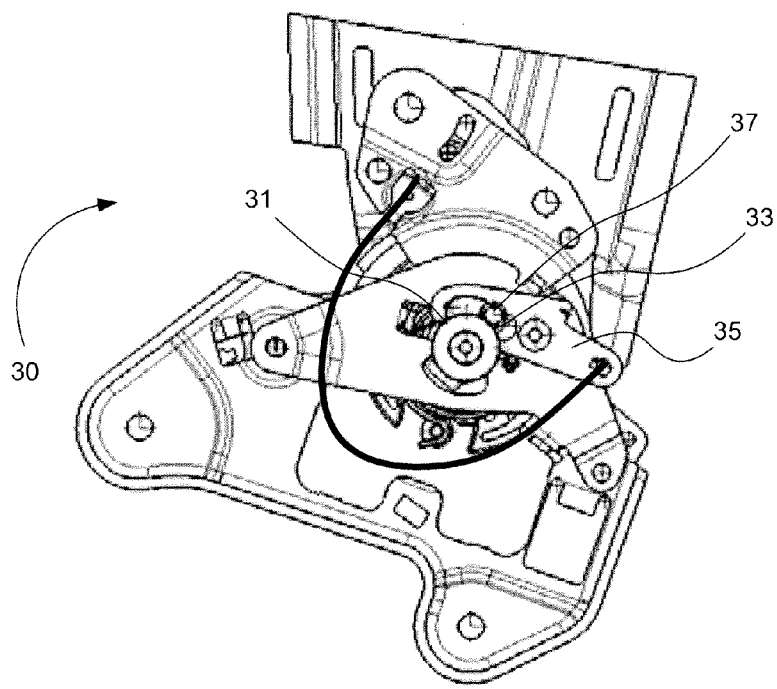
FIG. 6 is a side view of a seat mechanism in an occupant seated position, with latch mechanism locked and recliner mechanism unlocked (for comfort adjust of seatback).

FIG. 6 discloses an exemplary embodiment of seat mechanism 30 in an occupant seating position, with latch mechanism 60 locked and recliner mechanism 50 unlocked to provide comfort adjust of seatback 15 to the user. Rotation of recliner release handle 21 rotates actuator 31 in a clockwise direction inducing the finger 81 of actuator 31 into contact with lockout pin 37. Further rotation of actuator 31 drives lockout pin 37 into contact with the finger 82 of drive 33. Continued rotation of actuator 31 and subsequent rotation of drive 33 may release recliner mechanism 50 to allow the user to rotate the seatback, with respect to the seat-cushion, to provide for a specific comfort seating position.

Figure 7:
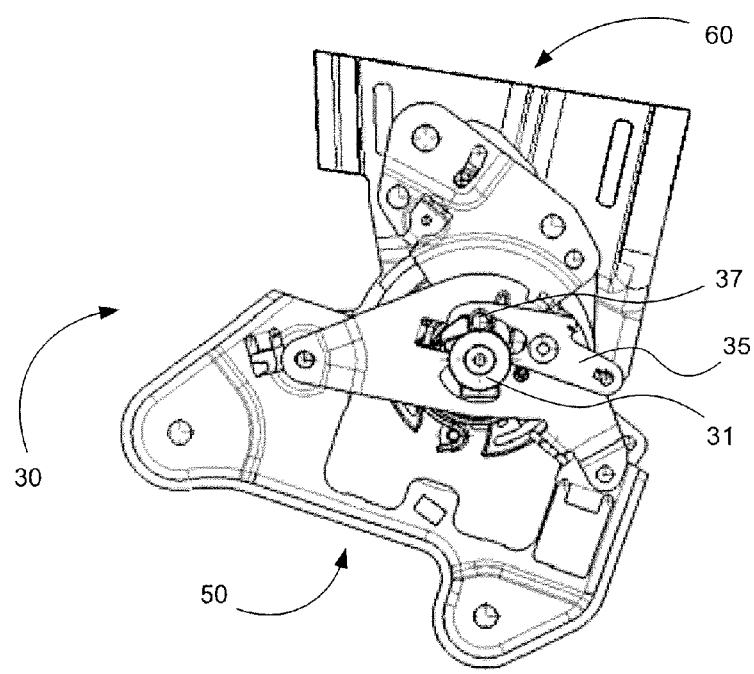
FIG. 7 is a side view of a seat mechanism in an occupant seated position with both recliner mechanism and latch mechanism locked.

Referring to FIG. 7, an exemplary embodiment illustrating seat mechanism 30 in an occupant seating position, with both recliner mechanism 50 and latch mechanism 60 locked. The home positions of actuator 31, lockout lever 35 are shown.

Figure 8:
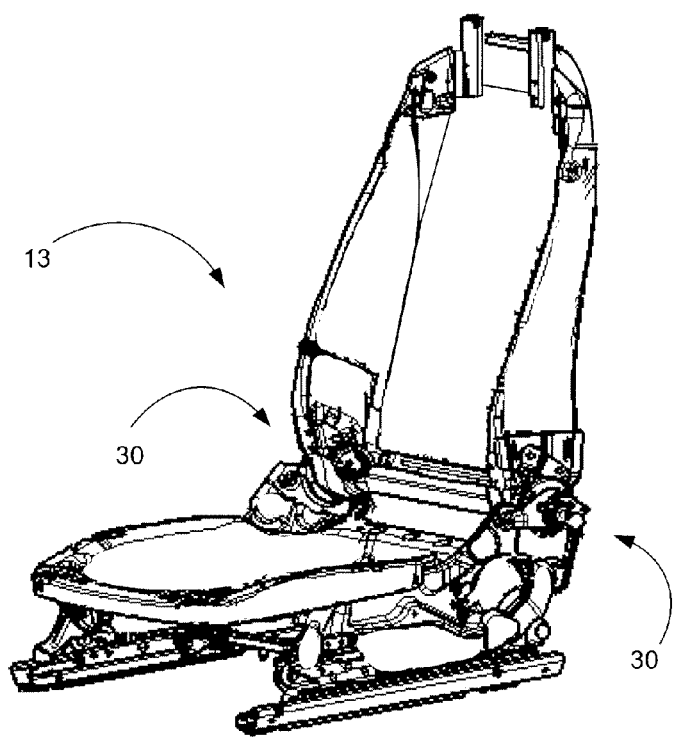
FIG. 8 is a perspective view of an exemplary embodiment (a seat structure) utilizing seat mechanism.

Referring to FIG. 8, an exemplary embodiment of seat mechanism 30 connected to a seat structure contained within seat system 13 is illustrated. Seat mechanism 30 is shown utilizing a dual sided configuration with a left-hand side as shown in FIG. 7 and with a right-hand side symmetrically opposite. An alternative embodiment may utilize a single sided configuration with one seat mechanism 30 on one side and a "free pivot" on the other side. An exemplary embodiment has a pair of tracks connected to the cushion frame to provide forward and rearward comfort adjust of seat and to also provide additional ingress for seat system 13 when latch release handle is actuated.

It should be noted that references to "front," "rear," "top," and "base" in this description are merely used to identify various elements as are oriented in the Figures, with "front" and "rear" being relative to the environment in which the device is provided.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is important to note that the construction and arrangement of the vehicle seating system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present embodiments.

The U.S. priority application 60/897,131 filed Jan. 24, 2007, including the specification, drawings, claims and abstract, is incorporated herein by reference in its entirety.

What is claimed is:

1. A seat system for an occupant of a vehicle, the seat system including a seat-bottom and a seat-back and comprising:
   a recliner mechanism for providing rotation of the seatback for comfort of the occupant, wherein the recliner mechanism is configured to be locked in a selected position corresponding to a specific comfort seat-back position selected by the occupant, the recliner mechanism being configured to be activated by a comfort adjust handle;

a latch mechanism configured to unlock to allow forward rotation of the seat-back to provide ingress to a second seat positioned rearward in the vehicle from the seat system;

a lockout mechanism configured to prevent release of the recliner mechanism from the selected position when the latch mechanism is unlocked so that the seat-back returns to the specific comfort seat-back position when the latch mechanism is in the locked position; and a drive that rotates to disengage the recliner mechanism, wherein the latch mechanism is configured to unlock so as to allow forward rotation of the seat-back to provide ingress to the second seat without rotating the drive so as to prevent release of the recliner mechanism, and wherein the comfort adjust handle is configured to be freely rotatable when the latch mechanism is unlocked so as to allow forward rotation of the seat-back to provide ingress to the second seat.

2. The seat system of claim 1, wherein the latch mechanism is unlocked by actuating a release handle; wherein movement of the release handle causes corresponding movement of a lockout pin to prevent release of the drive so as to prevent release of the recliner mechanism from the selected position.

3. The seat system of claim 2, further comprising a stud that is pivotally connected to a lockout cable; wherein the stud is pivotable about a pivot; wherein movement of the release handle rotates the stud and strokes the lockout cable; wherein the lockout mechanism includes a lockout lever pivotally attached to a pivot stud; and wherein the lockout cable being stroked is attached to the lockout lever and includes the lockout lever to rotate about the pivot stud.

4. The seat system of claim 1, wherein the latch mechanism comprises a pawl and a cam such that rotation of the cam causes disengagement of the pawl from a tooth plate so that the seat-back rotates relative to the seat-bottom to provide ingress to the second seat without rotating the drive.

5. The seat system of claim 1, wherein the latch mechanism is unlocked by actuating the release handle; and wherein the release handle is connected to an actuator that includes a first finger, which is pivotally connected to a drive that includes a second finger.

6. The seat system of claim 5, wherein the second finger is connected to a lockout pin which is connectable to the first finger, whereby rotation of the drive provides release of the recliner mechanism via a cam internal to the recliner mechanism.

7. The seat system of claim 6, wherein movement of the release handle causes corresponding movement of a lockout pin to prevent rotation of the drive so as to prevent release of the recliner mechanism from the selected position.

8. The seat system of claim 7, wherein the lockout mechanism includes a lockout lever pivotally attached to a pivot stud, and wherein the lockout lever pivots to cause the lockout pin to move to a position that no longer engages the first finger of the actuator so as to prevent rotation of the drive.

9. The seat system of claim 8, wherein the lockout pin slides along a slot on the lockout lever.

10. The seat system of claim 7, further comprising a stud that is pivotally connected to a lockout cable; wherein movement of the release handle rotates the stud and strokes the lockout cable; wherein the lockout mechanism includes a lockout lever pivotally attached to a pivot stud; and wherein the lockout cable being stroked is attached to the lockout lever and includes the lockout lever to rotate about the pivot stud.

11. The seat system of claim 1, wherein the drive is rigidly connected to a cam that is internal to the recliner mechanism.

12. A seat system for an occupant of a vehicle, the seat system including a seat-bottom and a seat-back and comprising:

a recliner mechanism for providing rotation of the seat-back for comfort of the occupant, wherein the recliner mechanism is configured to be locked in a selected position corresponding to a specific comfort seat-back position selected by the occupant;

a latch mechanism configured to unlock to allow forward rotation of the seat-back to provide ingress to a second seat positioned rearward in the vehicle from the seat system;

a lockout mechanism configured to prevent release of the recliner mechanism from the selected position when the latch mechanism is unlocked so that the seat-back returns to the specific comfort seat-back position when the latch mechanism is in a locked position; and a drive that rotates to disengage the recliner mechanism, wherein the latch mechanism is configured to unlock so as to allow forward rotation of the seat-back to provide ingress to the second seat without rotating the drive so as to prevent release of the recliner mechanism, wherein the latch mechanism is unlocked by actuating a release handle, wherein movement of the release handle causes corresponding movement of a lockout pin to prevent rotation of the drive so as to prevent release of the recliner mechanism from the selected position, wherein the lockout mechanism includes a lockout lever pivotally attached to a pivot stud, and wherein the lockout lever pivots to cause the lockout pin to move to a position that no longer engages an actuator for the recliner mechanism so as to prevent rotation of the drive for preventing release of the recliner mechanism.

13. The seat system of claim 12, wherein the lockout pin slides along a slot on the lockout lever.

14. A seat system for an occupant of a vehicle, the seat system including a seat-bottom and a seat-back and comprising:

a recliner mechanism for providing rotation of the seat-back for comfort of the occupant, wherein the recliner mechanism is configured to be locked in a selected position corresponding to a specific comfort scat-back position selected by the occupant;

a latch mechanism configured to unlock to allow forward rotation of the seat-back to provide ingress to a second seat positioned rearward in the vehicle from the seat system;

a lockout mechanism configured to prevent release of the recliner mechanism from the selected position when the latch mechanism is unlocked so that the seat-back returns to the specific comfort seat-back position when the latch mechanism is in the locked position, an actuator;

a lockout pin; and a drive, wherein rotation of the actuator drives the lockout pin into contact with the drive such that the rotation of the actuator and subsequent rotation of the drive releases the recliner mechanism to allow the occupant to rotate the seat-back to provide for the specific comfort seat-back position, and wherein the lockout mechanism prevents release of the recliner mechanism when the latch mechanism is unlocked such that the actuator does not induce rotation through the lockout pin onto the drive, which would release the recliner mechanism.

15. The seat system of claim 14, wherein the latch mechanism is unlocked by actuating a release handle; and wherein movement of the release handle causes corresponding movement of the lockout pin to prevent the rotation of the drive so as to prevent release of the recliner mechanism from the selected position.

16. The seat system of claim 15, wherein the lockout mechanism includes a lockout lever pivotally attached to a pivot stud, and wherein the lockout lever pivots to cause the lockout pin to move to a position that no longer engages the actuator for the recliner mechanism so as to prevent rotation of the drive for preventing release of the recliner mechanism.

17. The seat system of claim 15, further comprising a stud that is pivotally connected to a lockout cable; wherein movement of the release handle rotates the stud and strokes the lockout cable; wherein the lockout mechanism includes a lockout lever; and wherein the lockout cable being stroked is attached to the lockout lever and induces the lockout lever, which is pivotally connected to a pivot stud, to rotate about the pivot stud.

18. The seat system of claim 14, wherein the latch mechanism comprises a pawl and a cam such that rotation of the cam causes disengagement of the pawl from a tooth plate so that the seat-back rotates relative to the seat-bottom to provide ingress to the second seat without rotating the drive.

19. The seat system of claim 14, wherein the latch mechanism is unlocked by actuating a release handle; and wherein the release handle is connected to the actuator that includes a first finger, which is pivotally connected to the drive that includes a second finger.

20. The seat system of claim 19, wherein the second finger is connectable to the lockout pin which is connectable to the first finger, whereby rotation of the drive provides release of the recliner mechanism via a cam internal to the recliner mechanism.

\* \* \* \* \*